US011544778B2

(12) United States Patent
Caldwell et al.

(10) Patent No.: US 11,544,778 B2
(45) Date of Patent: Jan. 3, 2023

(54) CREATING AN INTUITIVE VISUAL PLAN FOR ACHIEVING FINANCIAL GOALS

(71) Applicant: MX Technologies, Inc., Lehi, UT (US)

(72) Inventors: John Ryan Caldwell, Provo, UT (US); Ronald Brennan Knotts, Provo, UT (US); Jonathan R. Hopkins, Pleasant Grove, UT (US)

(73) Assignee: MX TECHNOLOGIES, INC., Lehi, UT (US)

( * ) Notice: Subject to any disclaimer, the term of this patent is extended or adjusted under 35 U.S.C. 154(b) by 884 days.

(21) Appl. No.: 14/481,772

(22) Filed: Sep. 9, 2014

(65) Prior Publication Data

US 2015/0081498 A1    Mar. 19, 2015

Related U.S. Application Data

(60) Provisional application No. 61/875,446, filed on Sep. 9, 2013.

(51) Int. Cl.
| | |
|---|---|
| *G06Q 40/00* | (2012.01) |
| *G06F 3/04842* | (2022.01) |
| *G06Q 40/02* | (2012.01) |
| *G06Q 40/06* | (2012.01) |

(52) U.S. Cl.
CPC ......... *G06Q 40/00* (2013.01); *G06F 3/04842* (2013.01); *G06Q 40/02* (2013.01); *G06Q 40/06* (2013.01)

(58) Field of Classification Search
CPC . G06F 3/04855; G06F 3/04842; G06Q 40/00; G06Q 40/02; G06Q 40/06
USPC .................................................... 705/35–45
See application file for complete search history.

(56) References Cited

U.S. PATENT DOCUMENTS

| | | | |
|---|---|---|---|
| 5,276,785 A | * | 1/1994 | Mackinlay .......... G06F 3/04815 345/427 |
| 6,196,917 B1 | | 3/2001 | Mathias et al. |
| 6,198,483 B1 | | 3/2001 | Launais |
| D544,876 S | | 6/2007 | Yamazaki et al. |
| D582,934 S | | 12/2008 | Byeon |
| 7,467,356 B2 | | 12/2008 | Gettman et al. |
| D613,301 S | | 4/2010 | Lee et al. |
| 7,802,205 B2 | | 9/2010 | Bedingfield |
| D631,886 S | | 2/2011 | Vance et al. |
| 7,963,656 B2 | | 6/2011 | Kuno et al. |
| 8,384,718 B2 | | 2/2013 | Dahlke |
| D682,305 S | | 5/2013 | Mierau et al. |
| D696,264 S | | 12/2013 | d'Amore et al. |
| D696,265 S | | 12/2013 | d'Amore et al. |
| D697,935 S | | 1/2014 | Lee et al. |

(Continued)

FOREIGN PATENT DOCUMENTS

WO    WO2001065907    *  9/2001   ............. G06Q 40/00

OTHER PUBLICATIONS

'The Art and Science of Depiction' Fredo Durand, MIT LCS Graphics Group, 2000.*

(Continued)

*Primary Examiner* — Hai Tran
(74) *Attorney, Agent, or Firm* — Kunzler Bean & Adamson

(57) ABSTRACT

The disclosure extends to methods, systems, and computer program products for producing financial goal planning having two dimensional and three dimensional graphical representations for financial goals.

24 Claims, 16 Drawing Sheets

(56) References Cited

U.S. PATENT DOCUMENTS

| | | | |
|---|---|---|---|
| D699,249 S | 2/2014 | Fujii et al. | |
| D699,250 S | 2/2014 | Fujii et al. | |
| 8,701,005 B2 | 4/2014 | Bedingfield | |
| D704,204 S | 5/2014 | Rydenhag | |
| D706,301 S | 6/2014 | Akana et al. | |
| D706,302 S | 6/2014 | Akana et al. | |
| D708,193 S | 7/2014 | Agnew et al. | |
| 8,823,698 B2 | 9/2014 | Seo | |
| D717,823 S | 11/2014 | Brotman et al. | |
| D718,781 S | 12/2014 | Arnold et al. | |
| D721,086 S | 1/2015 | Hontz, Jr. | |
| D728,615 S | 5/2015 | Guzmá et al. | |
| 9,047,705 B1* | 6/2015 | Ko | G06Q 40/00 |
| 9,069,853 B2 | 6/2015 | Stading | |
| 9,081,483 B2 | 7/2015 | Nezu | |
| D735,754 S | 8/2015 | Chaudhri et al. | |
| D736,219 S | 8/2015 | Petersen et al. | |
| D737,278 S | 8/2015 | Shin et al. | |
| D737,319 S | 8/2015 | Cavander et al. | |
| D738,382 S | 9/2015 | Lim et al. | |
| D738,385 S | 9/2015 | Lim et al. | |
| D738,386 S | 9/2015 | Meegan et al. | |
| D739,425 S | 9/2015 | Shawki | |
| D740,307 S | 10/2015 | McAllister et al. | |
| D750,660 S | 3/2016 | Caldwell | |
| D751,096 S | 3/2016 | Moon et al. | |
| D751,108 S | 3/2016 | Caldwell | |
| D752,083 S | 3/2016 | Caldwell et al. | |
| D753,719 S | 4/2016 | Mariet et al. | |
| D753,720 S | 4/2016 | Mariet et al. | |
| D753,721 S | 4/2016 | Mariet et al. | |
| D753,722 S | 4/2016 | Mariet et al. | |
| D754,190 S | 4/2016 | Mariet et al. | |
| D754,203 S | 4/2016 | Mariet et al. | |
| D754,204 S | 4/2016 | Mariet et al. | |
| D796,531 S | 9/2017 | Caldwell et al. | |
| D796,532 S | 9/2017 | Caldwell et al. | |
| 2002/0093541 A1 | 7/2002 | Schileru-Key | |
| 2005/0010876 A1 | 1/2005 | Robertson et al. | |
| 2006/0074788 A1* | 4/2006 | Grizack | G06Q 40/02 705/35 |
| 2007/0011617 A1 | 1/2007 | Akagawa et al. | |
| 2007/0256030 A1 | 11/2007 | Bedingfield | |
| 2008/0163119 A1 | 7/2008 | Kim et al. | |
| 2009/0187335 A1 | 7/2009 | Muhlfelder et al. | |
| 2010/0050123 A1 | 2/2010 | Sherrard et al. | |
| 2010/0180227 A1 | 7/2010 | Diallo | |
| 2010/0268426 A1 | 10/2010 | Pathak et al. | |
| 2010/0333029 A1 | 12/2010 | Smith et al. | |
| 2011/0022982 A1 | 1/2011 | Takaoka et al. | |
| 2011/0239148 A1 | 9/2011 | Setlur | |
| 2011/0271186 A1 | 11/2011 | Owens | |
| 2013/0227450 A1 | 8/2013 | Na et al. | |
| 2014/0089836 A1 | 3/2014 | Damani et al. | |
| 2014/0279359 A1* | 9/2014 | MacInnes | G06Q 40/06 705/37 |
| 2014/0337773 A1 | 11/2014 | Phang et al. | |
| 2015/0081498 A1 | 3/2015 | Caldwell et al. | |

OTHER PUBLICATIONS

'A Brief History of Data Visualization', Michael Friendly, Handbook of Comutational Statistics: Data Visualization, Mar. 21, 2006.*

Dialog NPL (non-patent literature) Search Apr. 2, 2022. (Year: 2022).*

Google NPL (non-patent literature) Search, dated Apr. 2, 2022. (Year: 2022).*

Google Scholar NPL Search, dated Apr. 2, 2022. (Year: 2022).*

U.S. Appl. No. 29/543,025 Office Action dated Dec. 2, 2015.

U.S. Appl. No. 29/543,025 Notice of Allowance dated Feb. 10, 2016.

Derr, Andrew. "Shutter Stock—Image ID: 255006682." Shutter Stock., Jul. 11, 2012 [online], [retrieved on Jul. 14, 2016]. Retrieved from the Internet <URL: http://www.shutterstock.com/pic-255006682.html>.

3Art. "Shutter Stock—Image ID: 300077855." Shutter Stock., May 24, 2011 [online], [retrieved on Jul. 14, 2016]. Retrieved from the internet <URL: http://www.shutterstock.com/pic-300077855/stock-vector-infographic-elements-futuristic-user-interface-hud-ui-ux-abstract-background-with-connecting-dots.html>.

Mikhail_grachikov. "Deposit Photos—Stock Illustration #80752382." Deposit Photos., Jan. 18, 2012 [online], [retrieved on Jul. 14, 2016]. Retrieved from the Internet <URL: http://depositphotos.com/search/control-hub.html?AVXU2sVNbX8y4zPKyYK_=&qview=80752382>.

U.S. Appl. No. 29/556,878, Notice of Allowance, dated Jul. 28, 2016.

U.S. Appl. No. 29/556,879, Notice of Allowance, dated Jul. 29, 2016.

U.S. Appl. No. 29/556,875 Notice of Allowance dated Apr. 27, 2017.

U.S. Appl. No. 29/556,877 Notice of Allowance dated Apr. 27, 2017.

* cited by examiner

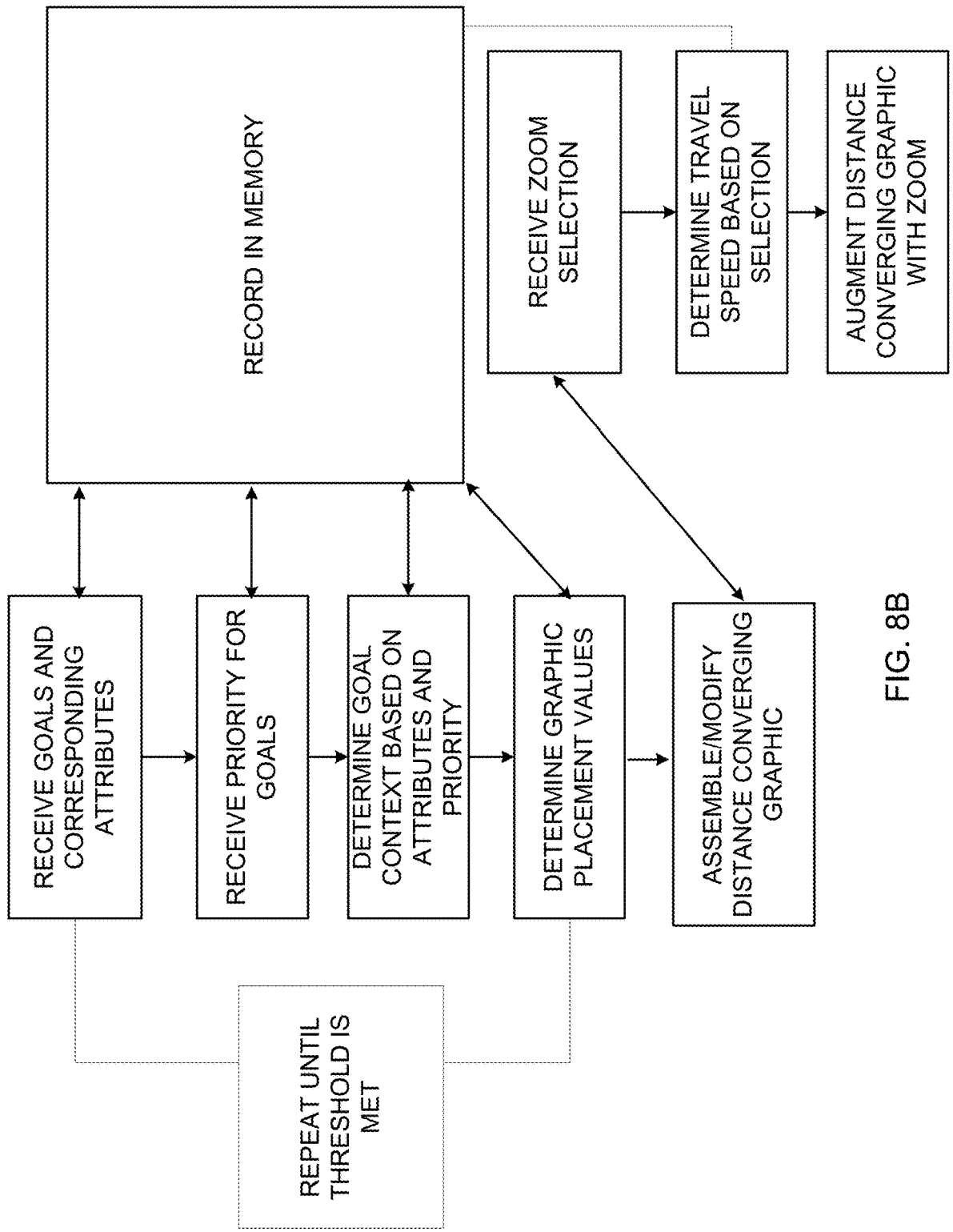

CREATING AN INTUITIVE VISUAL PLAN FOR ACHIEVING FINANCIAL GOALS

CROSS-REFERENCE TO RELATED APPLICATIONS

This application claims the benefit of U.S. Provisional Application No. 61/875,446, filed Sep. 9, 2013, which is hereby incorporated by reference herein in its entirety, including but not limited to those portions that specifically appear hereinafter, the incorporation by reference being made with the following exception: In the event that any portion of the above-referenced provisional application is inconsistent with this application, this application supersedes said above-referenced provisional application.

STATEMENT REGARDING FEDERALLY SPONSORED RESEARCH OR DEVELOPMENT

Not applicable.

BACKGROUND

Advances in technology have provided advances financial planning capabilities for more and more users. One area that has enjoyed some of the most beneficial advances is that of improved and intuitive graphical interfaces for better depicting financial goals.

The disclosure relates generally to financial goal setting and planning over long periods of time. The disclosure relates more particularly, but not necessarily entirely, to a system for producing multi-dimensional graphics that represent complex financial goals.

The features and advantages of the disclosure will be set forth in the description which follows, and in part will be apparent from the description, or may be learned by the practice of the disclosure without undue experimentation. The features and advantages of the disclosure may be realized and obtained by means of the computing systems and combinations of firmware, software and hardware, particularly pointed out in the appended claims.

BRIEF DESCRIPTION OF THE DRAWINGS

Non-limiting and non-exhaustive implementations of the disclosure are described with reference to the following figures, wherein like reference numerals refer to like parts throughout the various views unless otherwise specified. Advantages of the disclosure will become better understood with regard to the following description and accompanying drawings where:

FIGS. 8A and 8B illustrate embodiments in accordance with the principles and teachings of the disclosure;

DETAILED DESCRIPTION

The disclosure extends to methods, systems, and computer based products for financial planning. In the following description of the disclosure, reference is made to the accompanying drawings, which form a part hereof, and in which is shown by way of illustration specific implementations in which the disclosure may be practiced. It is understood that other implementations may be utilized and structural changes may be made without departing from the scope of the disclosure.

As used herein converging-lines distance graphic is intended to denote a representation of three dimensional spaces wherein the converging lines produce the impression of distance.

It is also to be understood that the terminology employed herein is used for the purpose of describing particular embodiments only and is not intended to be limiting since the scope of the disclosure will be limited only by the appended claims and equivalents thereof.

In describing and claiming the subject matter of the disclosure, the following terminology will be used in accordance with the definitions set out below.

It must be noted that, as used in this specification and the appended claims, the singular forms "a," "an," and "the" include plural referents unless the context clearly dictates otherwise.

As used herein, the terms "comprising," "including," "containing," "characterized by," and grammatical equivalents thereof are inclusive or open-ended terms that do not exclude additional, unrecited elements or method steps.

As used herein, the phrase "consisting of" and grammatical equivalents thereof exclude any element or step not specified in the claim.

As used herein, the phrase "consisting essentially of" and grammatical equivalents thereof limit the scope of a claim to the specified materials or steps and those that do not materially affect the basic and novel characteristic or characteristics of the claimed disclosure.

As used herein, the term "proximal" shall refer broadly to the concept of a portion nearest an origin.

As used herein, the term "distal" shall generally refer to the opposite of proximal, and thus to the concept of a portion farther from an origin, or a furthest portion, depending upon the context.

Figure 1:
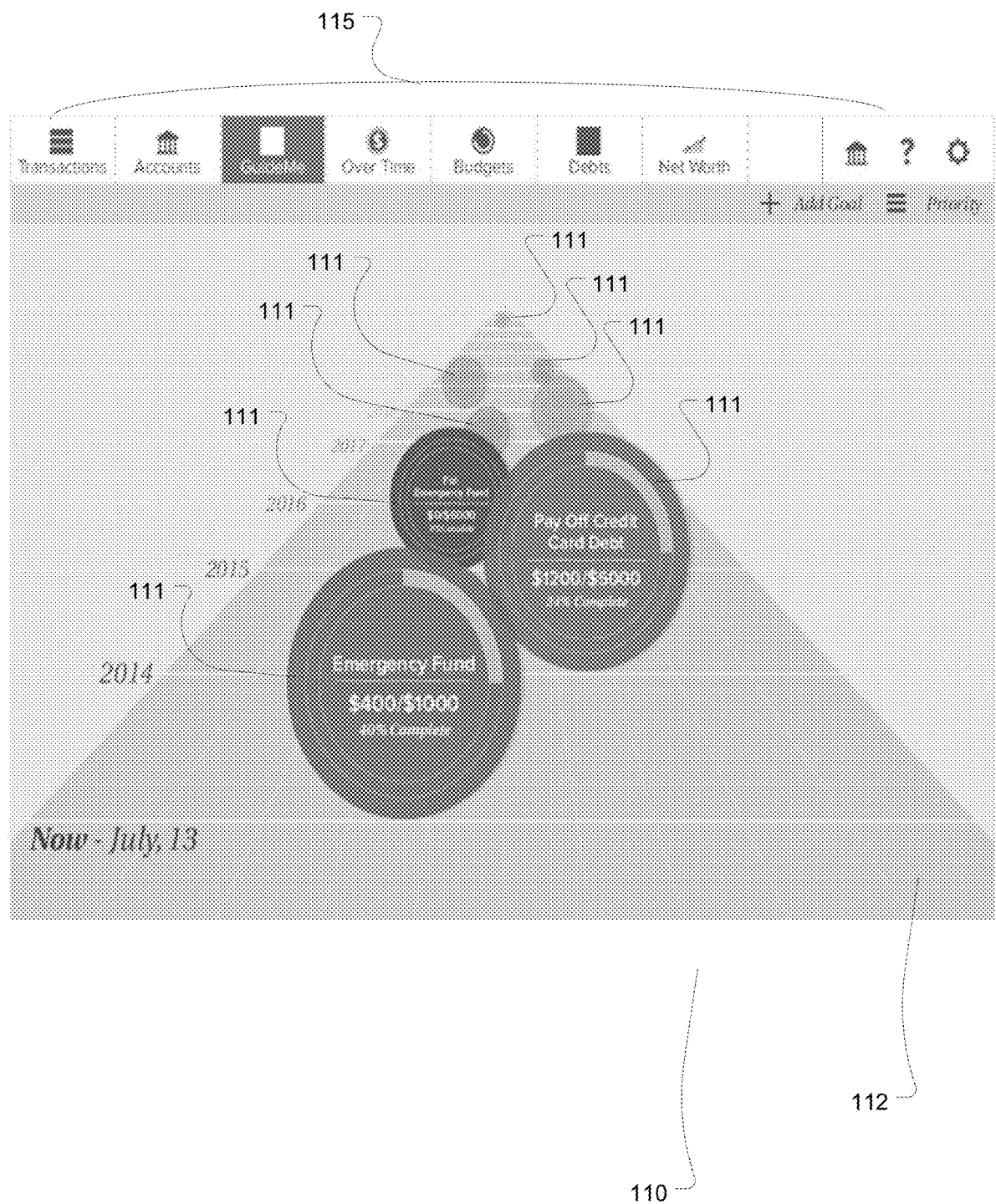
FIG. 1 is a schematic view of an embodiment in accordance with the principles and teachings of the disclosure.

Referring now to FIG. 1, the systems and methods for producing and achieving financial goals in a computing environment will be discussed. FIG. 1 illustrates a user interface view of a financial goal plan 110. As can be seen in the figure, a plurality of financial goals 111 may be embodied as a plurality of circles each having a context in the form of an area and size, wherein the area of each circle corresponds to the amount (money value) of each of the plurality of goals. Such a configuration allows for intuitive functionality by allowing a user to get a sense of their progress toward their fiscal goals at a glance and thereby intuitively comparing sizes of each of the circles. It should also be noted that a temporal aspect of the financial goals can also be shown with the use of a converging distance graphic. As will be discussed in greater detail below, the temporal aspect of the financial goal plan 110 enables a system to spatially order the goals 111 such that the relative timing of a plurality of goals 111 can be discerned with a very quick look at the converging distance graphic financial goal plan 110, because the goals placed earlier in time within the graphic are displayed in the foreground while later timed items are shown in the background. In an embodiment the special nature of the goals 111 may be further emphasized by having those graphical representations of the goals 111 in the foreground (earlier in time) cover portions of the graphical representations of the goals that are in the background (later in time). The converging distance graphic may be styled so as to give the user a sense of looking down a pathway toward the horizon, and may further comprise sign posts for marking the user's financial benchmarks or financial goals 111.

Additionally, as can be seen in FIG. 1, an embodiment of a software product for planning financial goals may include additional tools 115 within the user interface. The features and data used in conjunction with deriving a financial planning product may be facilitated by a set of computer readable instructions for instructing a processor to perform data processes, as in illustrated with respect to FIG. 2.

An embodiment may comprise A method of financial goal planning comprising:
receiving a financial goal from a user wherein the financial goal comprises an amount value and a time value;
receiving a priority value from a user corresponding to the financial goal;
determining a context for the financial goal based at least in part on the amount value and the priority value;
wherein the context for the financial goal is graphically represented by a two dimensional polygon that has an area corresponding to the amount value;
determining a relative position of the polygon along a distance-converging graphic based at least in part on the time value and the context such that placement within the distance-converging graphic portrays passage of time; and
displaying the relative position of the polygon along the distance-converging graphic to a user.

An embodiment further comprises a plurality of financial goals corresponding to a plurality of polygons and wherein each of the plurality of polygons have areas that are proportional to their corresponding amount value.

In an embodiment, the distance-converging graphic comprises converging bounding lines such that when displayed two dimensionally the bounding lines converge in an upward direction.

In an embodiment, the relative position of a plurality of polygons is displayed between the converging bounding lines and ordered according to the time values corresponding to a plurality of financial goals corresponding to the plurality of polygons.

In an embodiment, the area of the polygons are proportional to their position on the distance-converging graphic.

In an embodiment, the areas of the polygons have a maximum that is determined by a logarithmic factor such that maximum area of any of the polygons is limited.

In an embodiment, the areas of the polygons have a minimum that is determined by a logarithmic factor such that minimum area of any of the polygons is limited.

In an embodiment, the method further comprises determining the areas of the polygons based on available display size.

In an embodiment, the method further comprises displaying motion relative to the distance-converging graphic such that a user perceives traveling along the distance-converging graphic at a rate of travel.

In an embodiment, the rate of travel is determined by meeting a predetermined threshold corresponding to financial goals.

In an embodiment, the rate of travel is positive in a perceived forward motion.

In an embodiment, the rate of travel is negative in a perceived backward motion along the distance converging graphic.

In an embodiment, the method further comprises receiving a zoom level input from a user and causing perceived travel along the distance converging graphic.

Figure 2:
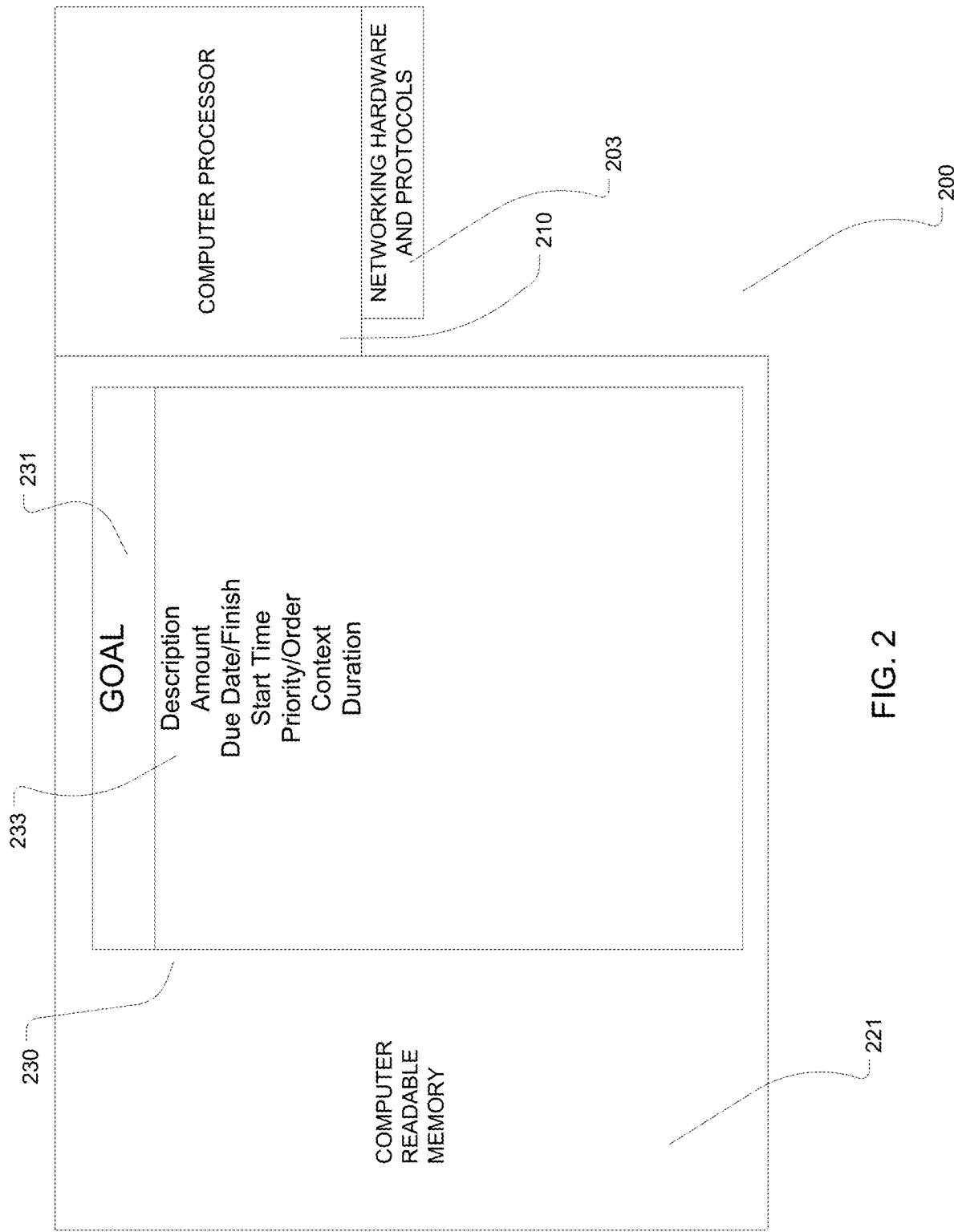
FIG. 2 is a schematic view of an embodiment in accordance with the principles and teachings of the disclosure.

Illustrated in FIG. 2 is a data and hardware schematic demonstrating the relationship between computer hardware, firmware, software and data. A financial system 200 may comprise a computer processor 210 and networking hardware/protocols 203 for enabling digital communications over a network. Additionally, the system 200 may comprise computer memory 221 and storage for maintaining digital data therein. In an embodiment, the memory 221 may comprise financial goal data 230 representing a plurality of goals. The goal data 231 may comprise attributes about the financial goal it represents. Attributes may comprise: description of the goal; amount, due date, start time, priority, order of importance relative to other goals, context (as discussed in more detail below), duration for accomplishing the goal, and etc.

Figure 3A:
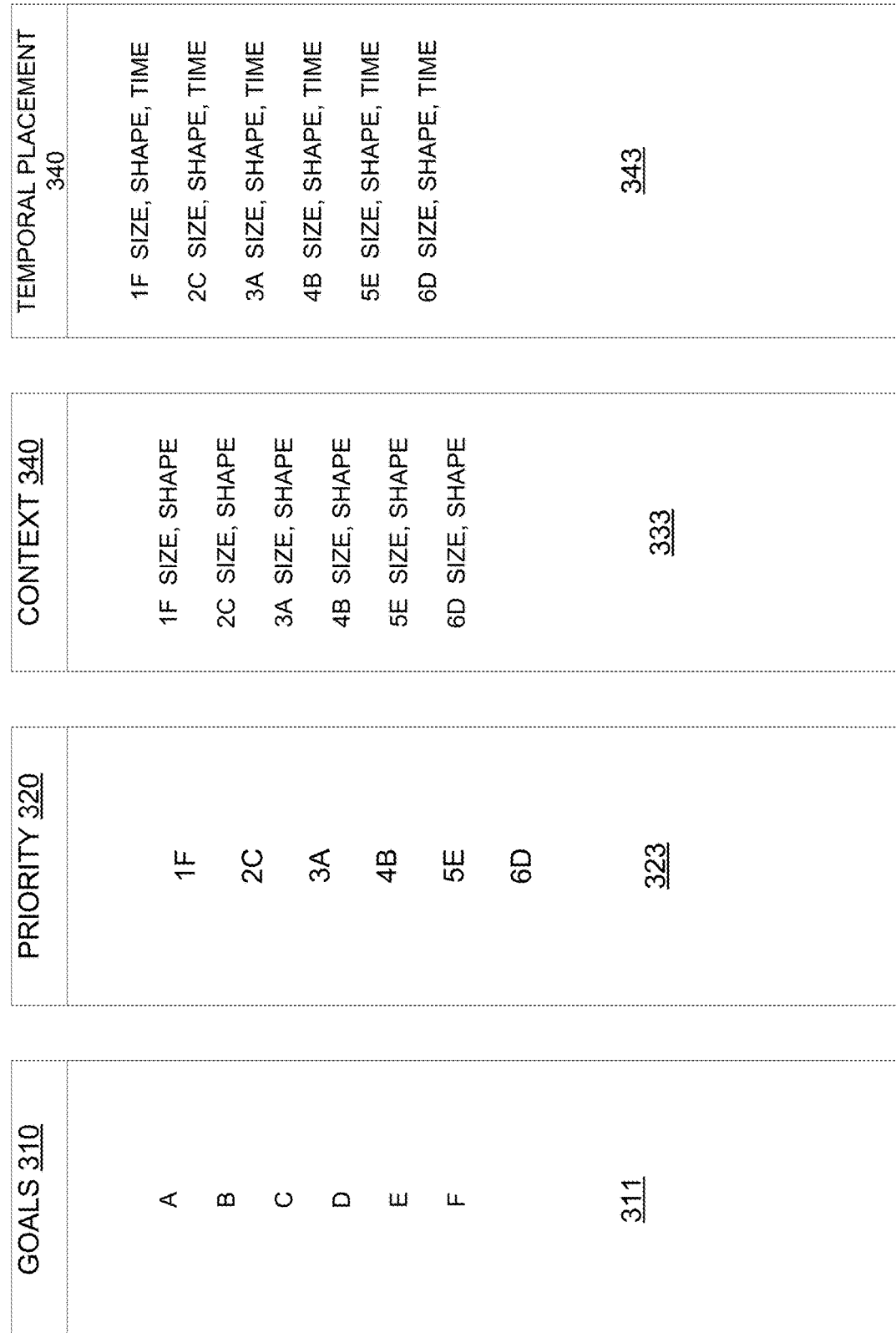
FIG. 3A is a schematic view of an embodiment in accordance with the principles and teachings of the disclosure.
Figure 3B:
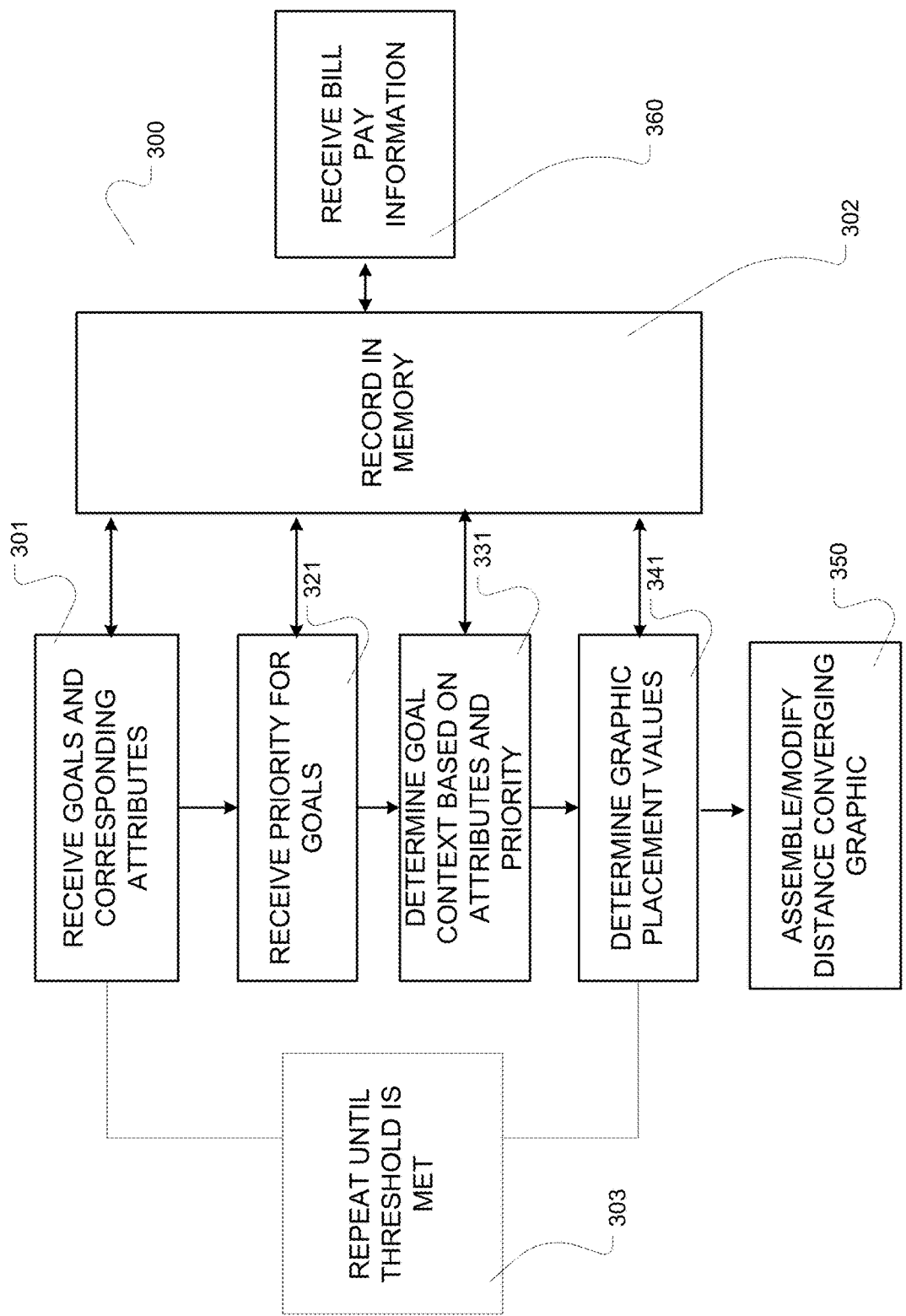
FIG. 3B is a schematic view of an embodiment in accordance with the principles and teachings of the disclosure.

FIG. 3A and FIG. 3B illustrate the progression/transformation of data associated with providing an intuitive visual financial plan for a user. At 301 of FIG. 3B a plurality of financial goals. At 302 a list of the financial goals 311 can be created and stored in computer memory. At 321, the financial goals 311 may be prioritized in order to distinguish each of the financial goals from the others in the list. At 331, a context value 333 is determined for each of the goals 311 based in part on the priority and amount that has been previously assigned at 301 and 321. It will be appreciated that context values may be influenced by many attributes and may be manually assigned. As used herein, context may appear in the form of providing a shape and an area value to each of the goals, such that when they are display graphically to a user several aspects of the goals can be readily recognized without having to study the numbers.

At 303, each of the steps of process 300 may be repeated to provide a dynamic financial plan. Additionally, at 360 the system may interact with an online bill pay process such that the visual plan is modified so as to be responsive to the bill pay activity.

At 341, placement values within the graphic may be determined for each of the goals. The placement values may be temporally based such that goals that are nearer in time appear before goals that happen later.

Finally, at 350, a financial goal graphic may be prepared and output to a user.

Figure 4A:
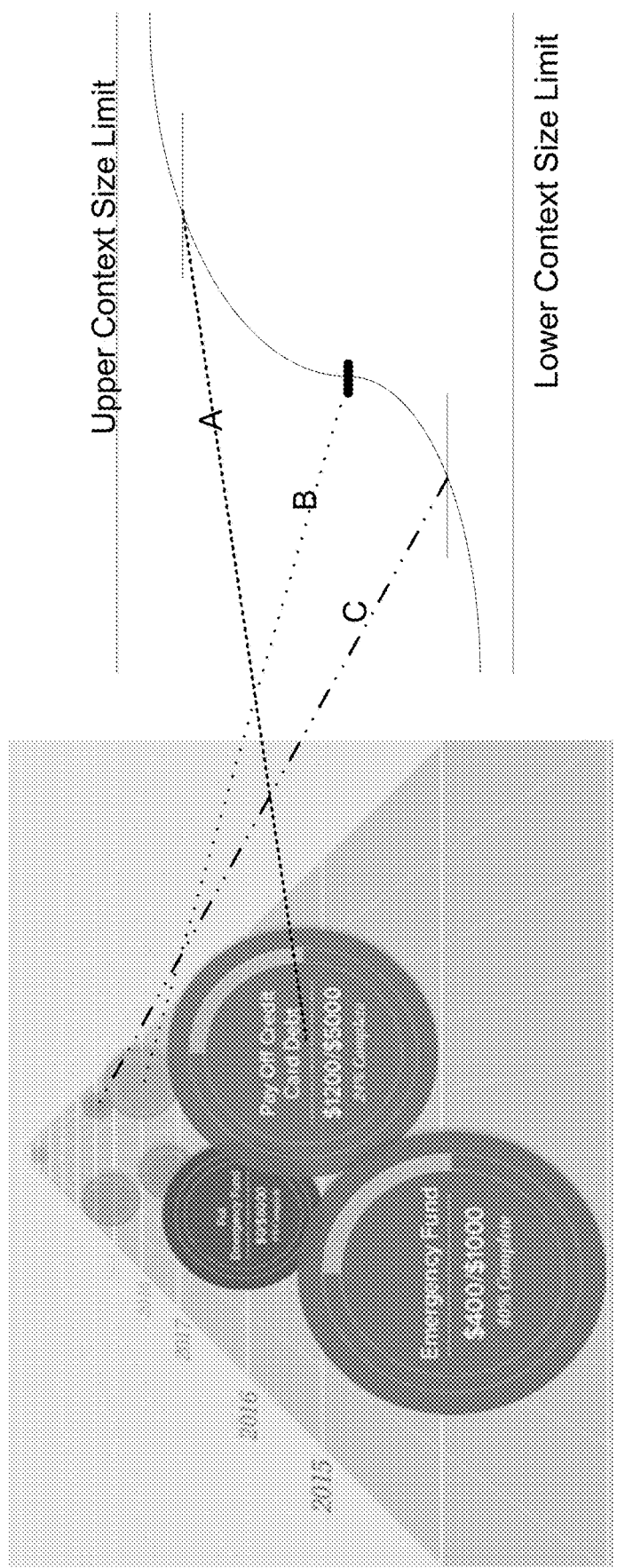
FIG. 4A is a schematic view of an embodiment in accordance with the principles and teachings of the disclosure.
Figure 4B:
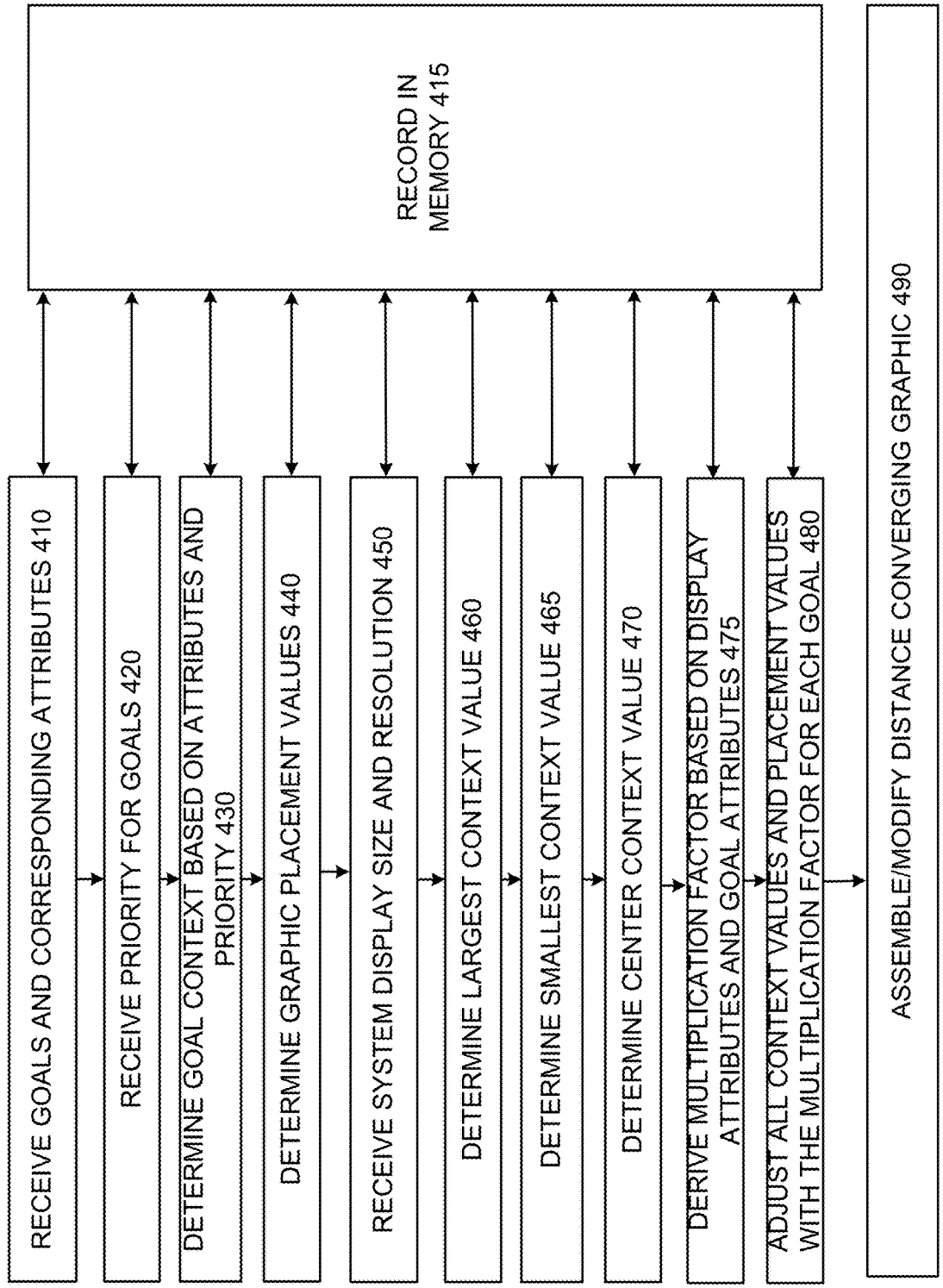
FIG. 4B is a schematic view of an embodiment in accordance with the principles and teachings of the disclosure.

Illustrated in FIG. 4A is a graphical representation of the correlation between context representation for each of the goals and predefined thresholds that normalize the graphical representations of the goals. For example, a goal representation related to the typical mortgage would dwarf all of the other goal shown within the graphic if it is not normalized in some way. FIG. 4B illustrates the process for normalizing large and small goals to produce an intuitive graphic. In an embodiment, at 410, goals and corresponding attributes are received by the system and stored in memory. At 420, the goals may be prioritized relative to each of the other goals. At 430, a context value is determined for each of the goals based in part on the priority and amount that has been previously assigned at 410 and 420. It will be appreciated that context values may be influenced by many attributes and may be manually assigned. As used herein, context may appear in the form of providing a shape and an area value to each of the goals, such that when they are display graphically to a user several aspects of the goals can be readily recognized without having to study the numbers.

Each of the steps of process 400 may be repeated to provide a dynamic financial plan that is responsive to adjustment. Additionally, the system may interact with an online bill pay process such that the visual plan is modified so as to be responsive to the bill pay activity. At 440, placement values within the graphic may be determined for each of the goals. The placement values may be temporally based such that goals that are nearer in time appear before goals that happen later.

At 450, display attributes may be received into the system 400. The system may then derive large and small context limitations in order to maintain the intuitive nature of the graphic. At 470, a middle context value may be determined. As is illustrated in FIG. 4A, these limits and midpoints may be made to correspond to an asymptotic graph whereby extreme goals may be normalized thereby. As can be seen in the figure, the intermediate values, steps, normalized values, asymptotes, etc. may be stored in memory within the hardware of the system at 415.

Finally, at 490, a financial goal graphic may be prepared and output to a user. It should be noted that a large percentage goals may naturally fall within the asymptotic values of 4A, however, slope of the graph can be adjusted manually or automatically to modify the appearance of the final output.

Figure 5A:
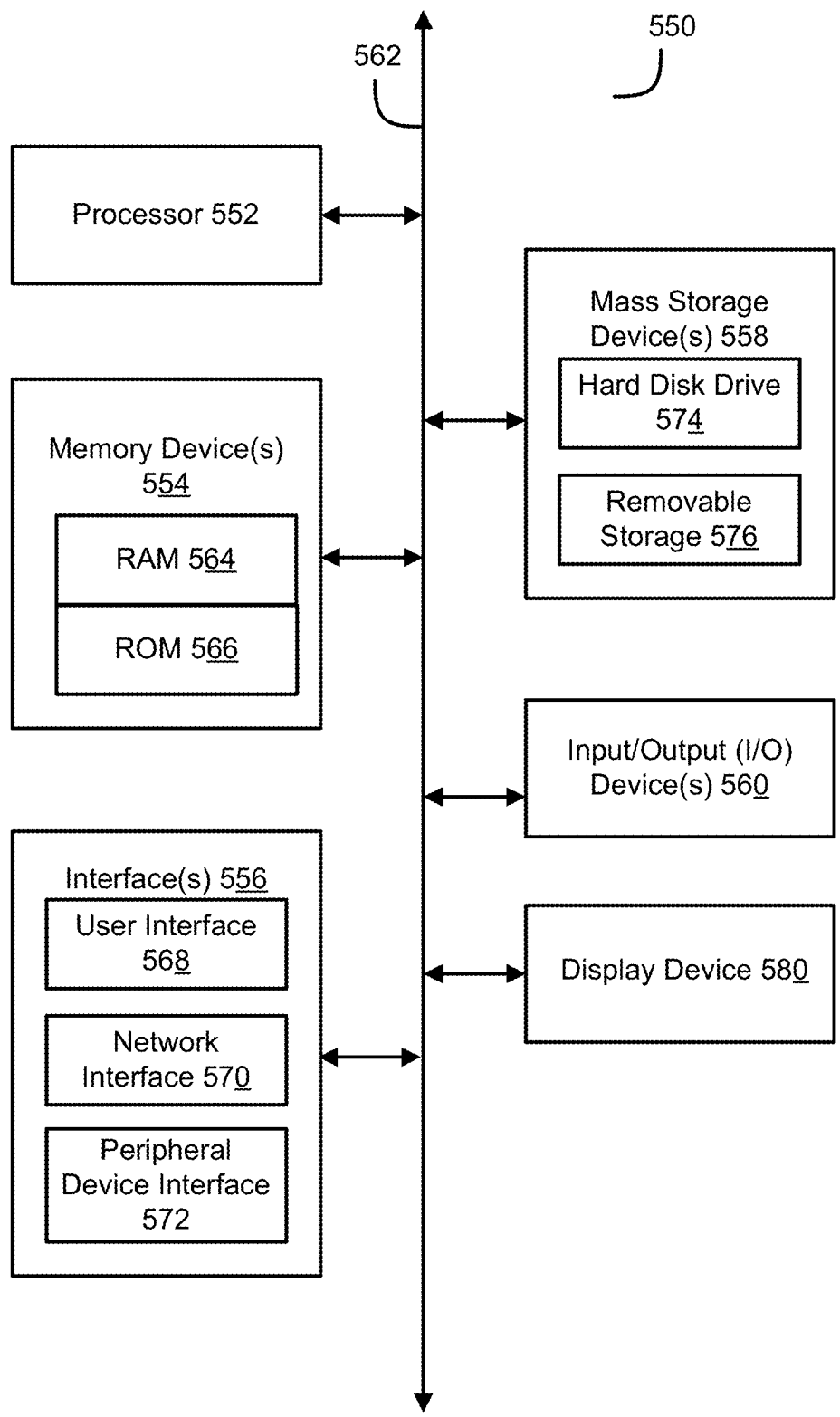
FIG. 5A is a graphical representation of supporting computer hardware in accordance with the principles and teachings of the disclosure.

Illustrated in FIG. 5A is a schematic representation of computer hardware and protocols that enable the various embodiments discussed herein. Implementations of the present disclosure may comprise or utilize a special purpose or general-purpose computer, including computer hardware, such as, for example, one or more processors and system memory, as discussed in greater detail below. Implementations within the scope of the present disclosure may also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, implementations of the disclosure can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. In an implementation, a sensor and camera control unit may be networked in order to communicate with each other, and other components, connected over the network to which they are connected. When information is transferred or provided over a network or another communications connection (either hardwired, wireless, or a combination of hardwired or wireless) to a computer, the computer properly views the connection as a transmission medium. Transmissions media can include a network and/or data links, which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures that can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. RAM can also include solid state drives (SSDs or PCIx based real time memory tiered storage, such as FusionIO). Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, control units, camera control units, hand-held devices, hand pieces, multi-processor systems, microprocessor-based or programmable consumer electronics, network PCs, minicomputers, mainframe computers, mobile telephones, PDAs, tablets, pagers, routers, switches, various storage devices, and the like. It should be noted that any of the above mentioned computing devices may be provided by or located within a brick and mortar location. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Further, where appropriate, functions described herein can be performed in one or more of: hardware, software, firmware, digital components, or analog components. For example, one or more application specific integrated circuits (ASICs) or field programmable gate arrays (FPGAs) can be programmed to carry out one or more of the systems and procedures described herein. Certain terms are used throughout the following description and Claims to refer to particular system components. As one skilled in the art will appreciate, components may be referred to by different names. This document does not intend to distinguish between components that differ in name, but not function.

FIG. 5A is a block diagram illustrating an example computing device 550. Computing device 550 may be used to perform various procedures, such as those discussed herein. Computing device 550 can function as a server, a client, or any other computing entity. Computing device 550 can perform various monitoring functions as discussed herein, and can execute one or more application programs, such as the application programs described herein. Computing device 550 can be any of a wide variety of computing devices, such as a desktop computer, a notebook computer, a server computer, a handheld computer, camera control unit, tablet computer and the like.

Computing device 550 includes one or more processor(s) 552, one or more memory device(s) 554, one or more interface(s) 556, one or more mass storage device(s) 558, one or more Input/Output (I/O) device(s) 560, and a display device 580 all of which are coupled to a bus 562. Processor(s) 552 include one or more processors or controllers that execute instructions stored in memory device(s) 554 and/or mass storage device(s) 558. Processor(s) 552 may also include various types of computer-readable media, such as cache memory.

Memory device(s) 554 include various computer-readable media, such as volatile memory (e.g., random access memory (RAM) 564) and/or nonvolatile memory (e.g., read-only memory (ROM) 566). Memory device(s) 554 may also include rewritable ROM, such as Flash memory.

Mass storage device(s) 558 include various computer readable media, such as magnetic tapes, magnetic disks, optical disks, solid-state memory (e.g., Flash memory), and so forth. As shown in FIG. 5A, a particular mass storage device is a hard disk drive 574. Various drives may also be included in mass storage device(s) 558 to enable reading from and/or writing to the various computer readable media. Mass storage device(s) 558 include removable media 576 and/or non-removable media.

I/O device(s) 560 include various devices that allow data and/or other information to be input to or retrieved from computing device 550. Example I/O device(s) 560 include digital imaging devices, electromagnetic sensors and emitters, cursor control devices, keyboards, keypads, microphones, monitors or other display devices, speakers, printers, network interface cards, modems, lenses, CCDs or other image capture devices, and the like.

Display device 580 includes any type of device capable of displaying information to one or more users of computing device 550. Examples of display device 580 include a monitor, display terminal, video projection device, and the like.

Interface(s) 506 include various interfaces that allow computing device 550 to interact with other systems, devices, or computing environments. Example interface(s) 556 may include any number of different network interfaces 570, such as interfaces to local area networks (LANs), wide area networks (WANs), wireless networks, and the Internet. Other interface(s) include user interface 568 and peripheral device interface 572. The interface(s) 556 may also include one or more user interface elements 568. The interface(s) 556 may also include one or more peripheral interfaces such as interfaces for printers, pointing devices (mice, track pad, etc.), keyboards, and the like.

Bus 562 allows processor(s) 552, memory device(s) 554, interface(s) 556, mass storage device(s) 558, and I/O device(s) 560 to communicate with one another, as well as other devices or components coupled to bus 562. Bus 562 represents one or more of several types of bus structures, such as a system bus, PCI bus, IEEE 1394 bus, USB bus, and so forth.

For purposes of illustration, programs and other executable program components are shown herein as discrete blocks, although it is understood that such programs and components may reside at various times in different storage components of computing device 550, and are executed by processor(s) 552. Alternatively, the systems and procedures described herein can be implemented in hardware, or a combination of hardware, software, and/or firmware. For example, one or more application specific integrated circuits (ASICs) or field programmable gate arrays (FPGAs) can be programmed to carry out one or more of the systems and procedures described herein.

Figure 5B:
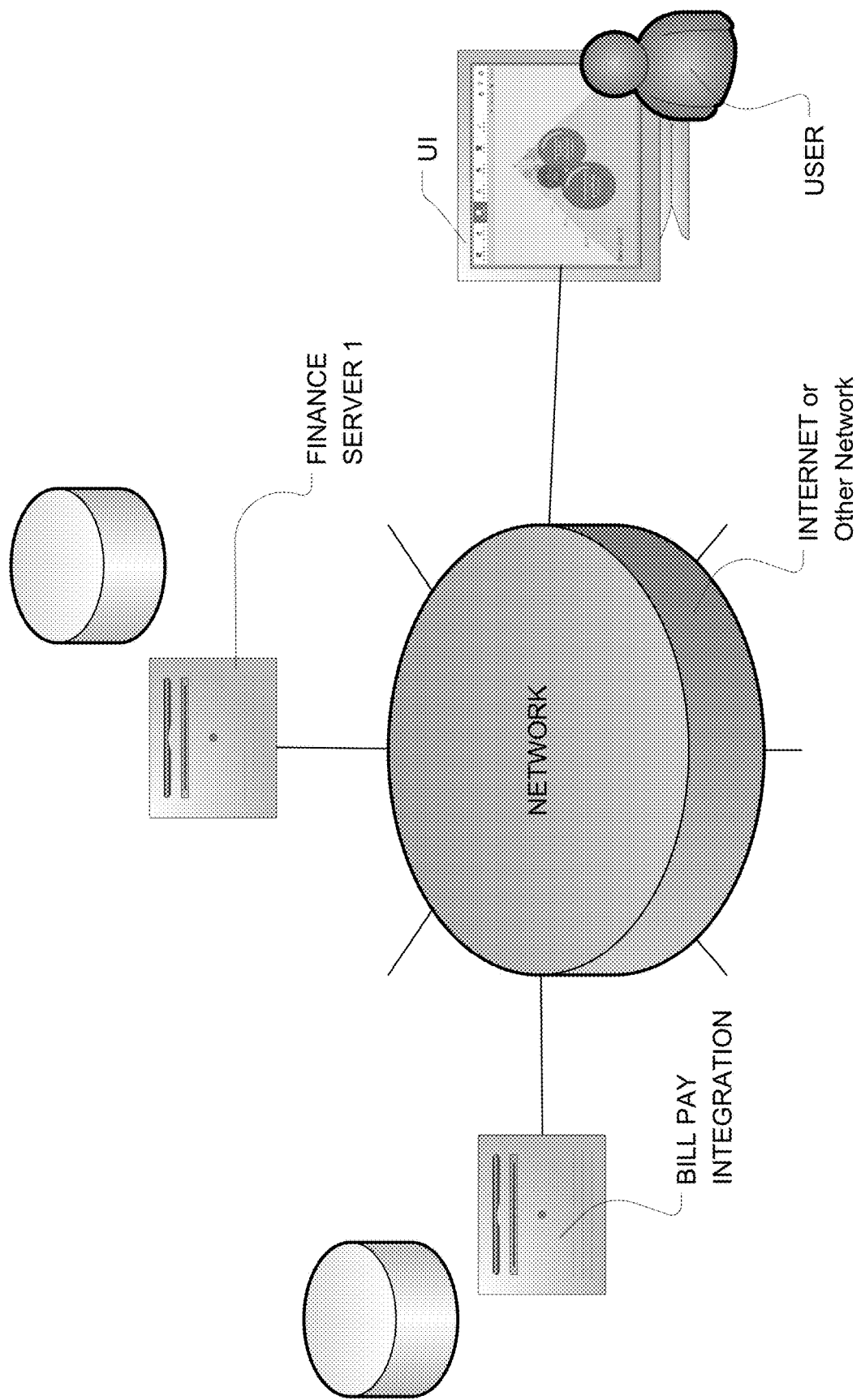
FIG. 5B is a graphical representation of supporting computer hardware in accordance with the principles and teachings of the disclosure.

FIG. 5B, illustrates an embodiment of a network comprising a User working through a User Interface to produce an intuitive financial plan for achieving goals. In an embodiment a plurality of financial servers can contribute data and interact with the user.

Figure 6A:
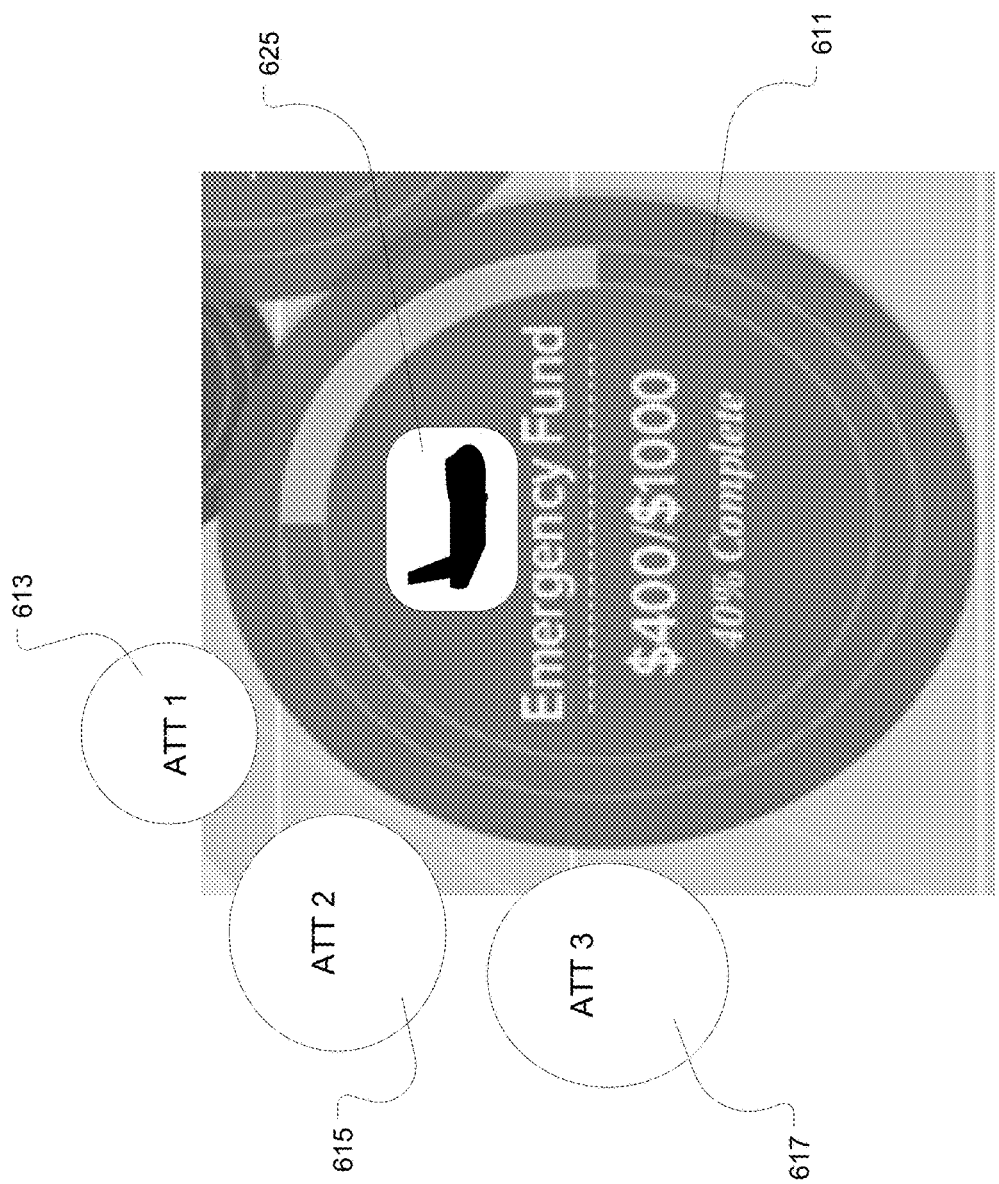
FIG. 6A illustrates an embodiment in accordance with the principles and teachings of the disclosure.

FIG. 6A, illustrates additional functionality and a method for providing layers of information that are made available to a user through selection graphic representation of the financial goal. As can be seen in the figure, additional attributes 613, 615, 617 may be shown in greater detail once the user has selected the goal item. The additional information may be stored within the associated server and pre-assembled for faster response time. The additional information may be stored on a third party server and may be derived at the time of request by the user.

FIG. 6A, illustrates the use of a simple graphic that can be associated with the goal in order to provide ease of use. It should be noted that if the context value is below a predetermined threshold, there may not be enough size within the goal representation to display the simple reminder graphic.

Figure 6B:
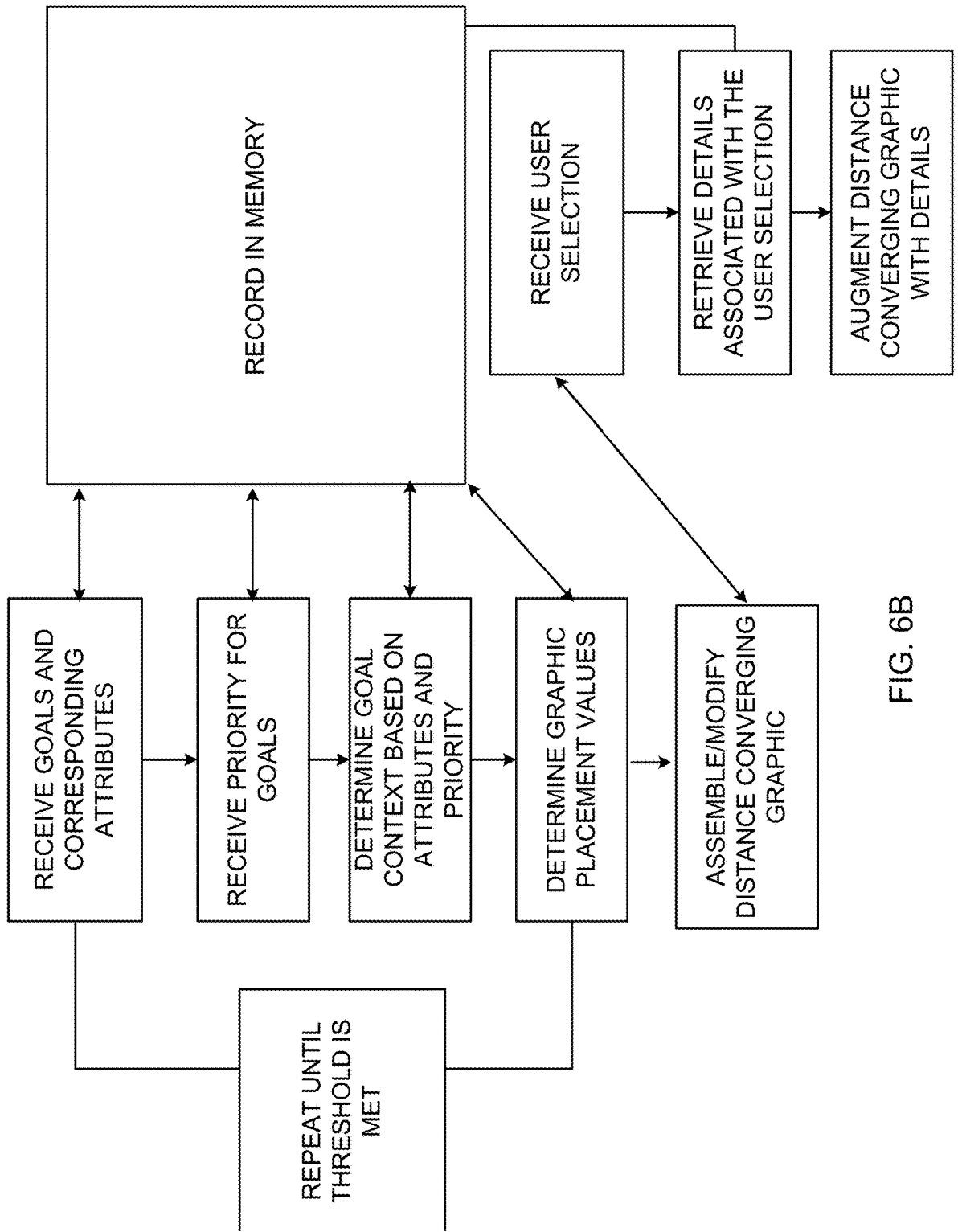
FIG. 6B illustrates an embodiment in accordance with the principles and teachings of the disclosure.

FIG. 6*b*, illustrates an embodiment of method steps for displaying addition information associated with a goal. At 610, receive goals and corresponding attributes, and at 620, receive priority for goals. At 630, determine goal context based on attributes and priority, and at 640, determine graphic placement values. At 690, augment distance converging graphic with details.

Figure 7A:
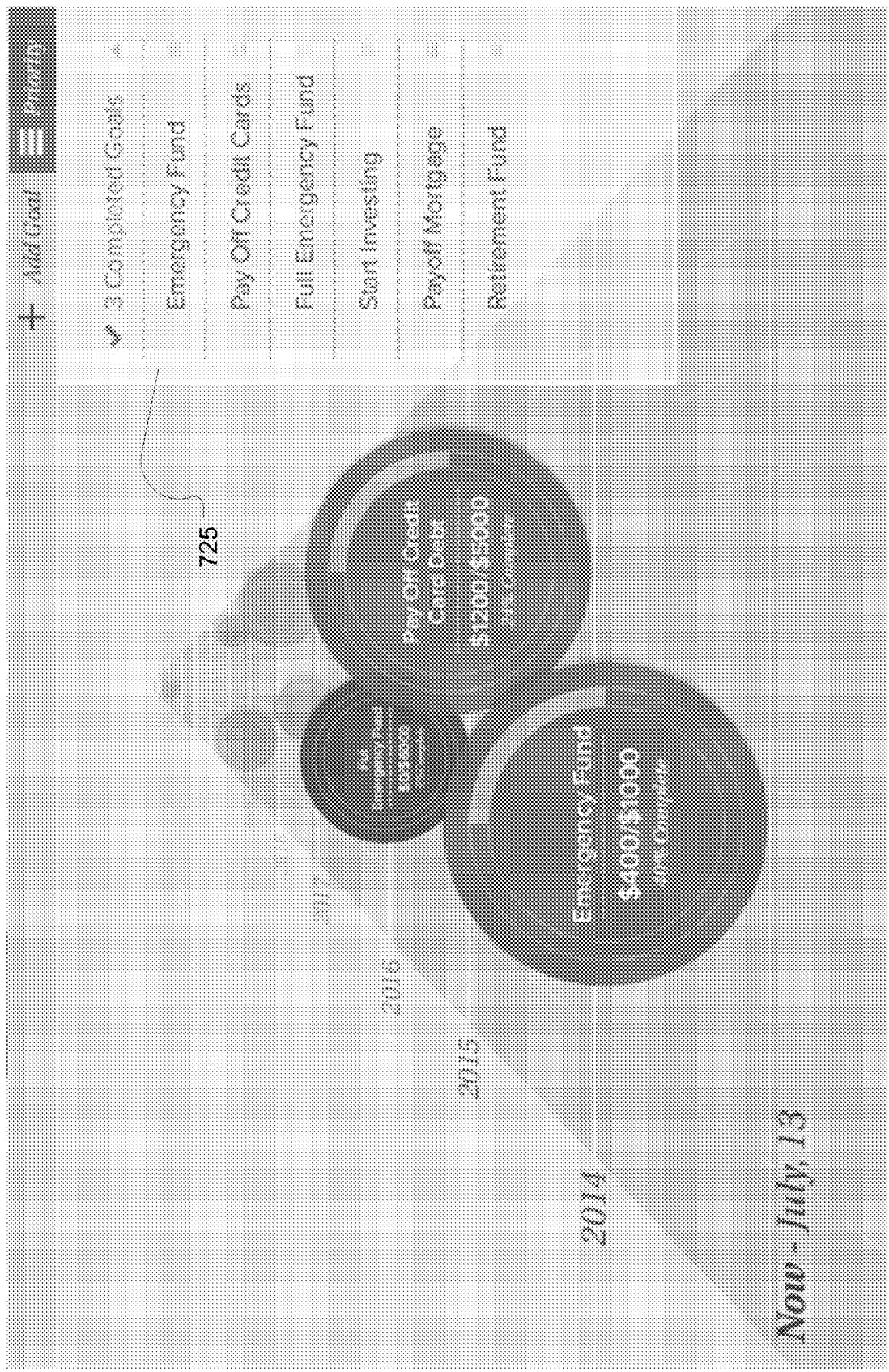
FIGS. 7A and 7B illustrate embodiments in accordance with the principles and teachings of the disclosure.

FIG. 7A, illustrates various ways of accessing and modifying the converging distance graphic. In an embodiment a drop down menu 725 may provide a user with the ability to change the graphic. The drop down menu 725 may be used in conjunction with direct select functionality that allows a user to select directly on the on the goal item. By directly the selecting the goal item, drag and drop protocols may be employed in some embodiments.

Figure 7B:
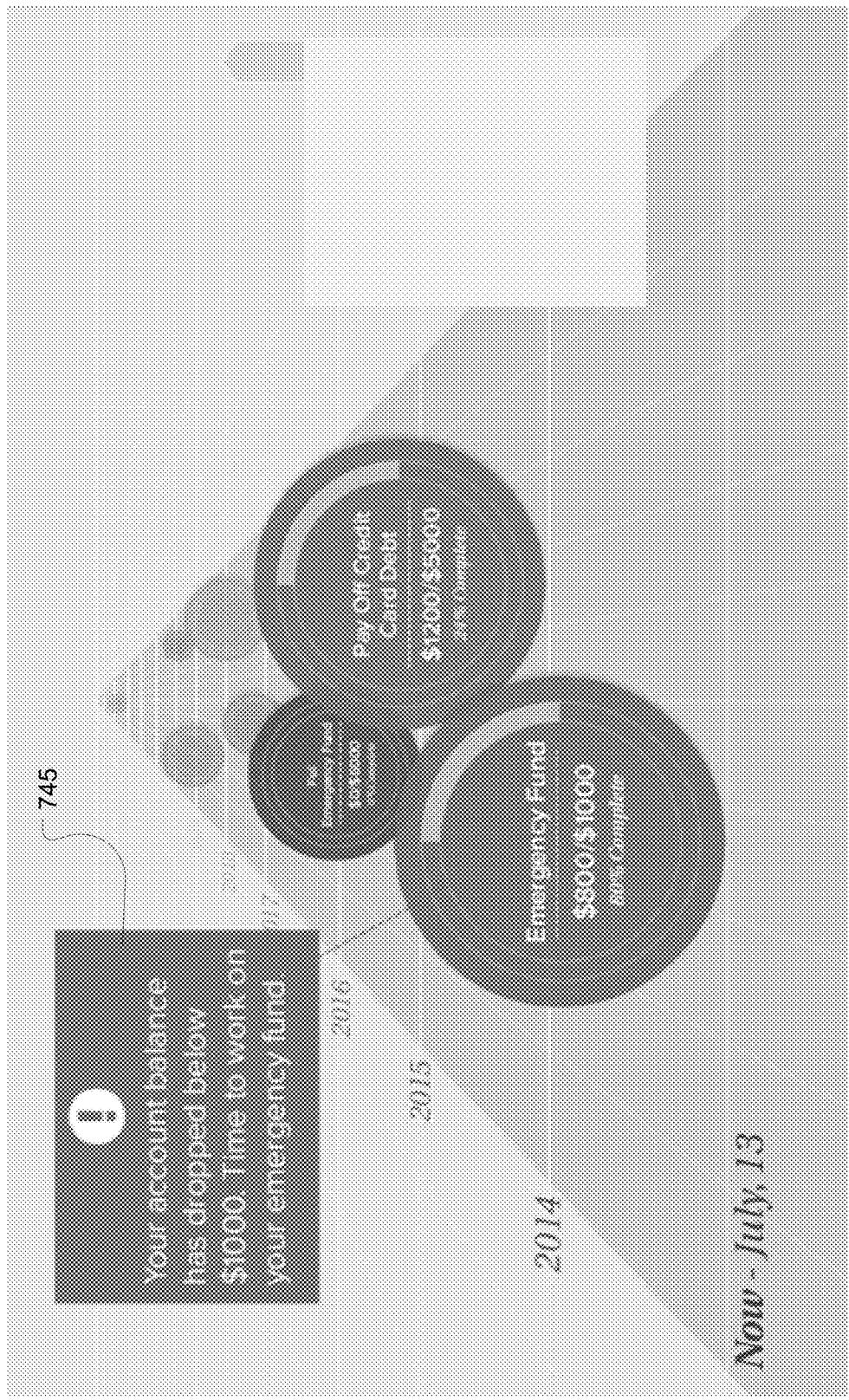

FIG. 7B, illustrates various ways of accessing and modifying the converging distance graphic. In an embodiment a pop up 745 may provide a user with additional information. The pop up 745 may be used in conjunction with direct select functionality that allows a user to select directly on the on the goal item.

Figure 8A:
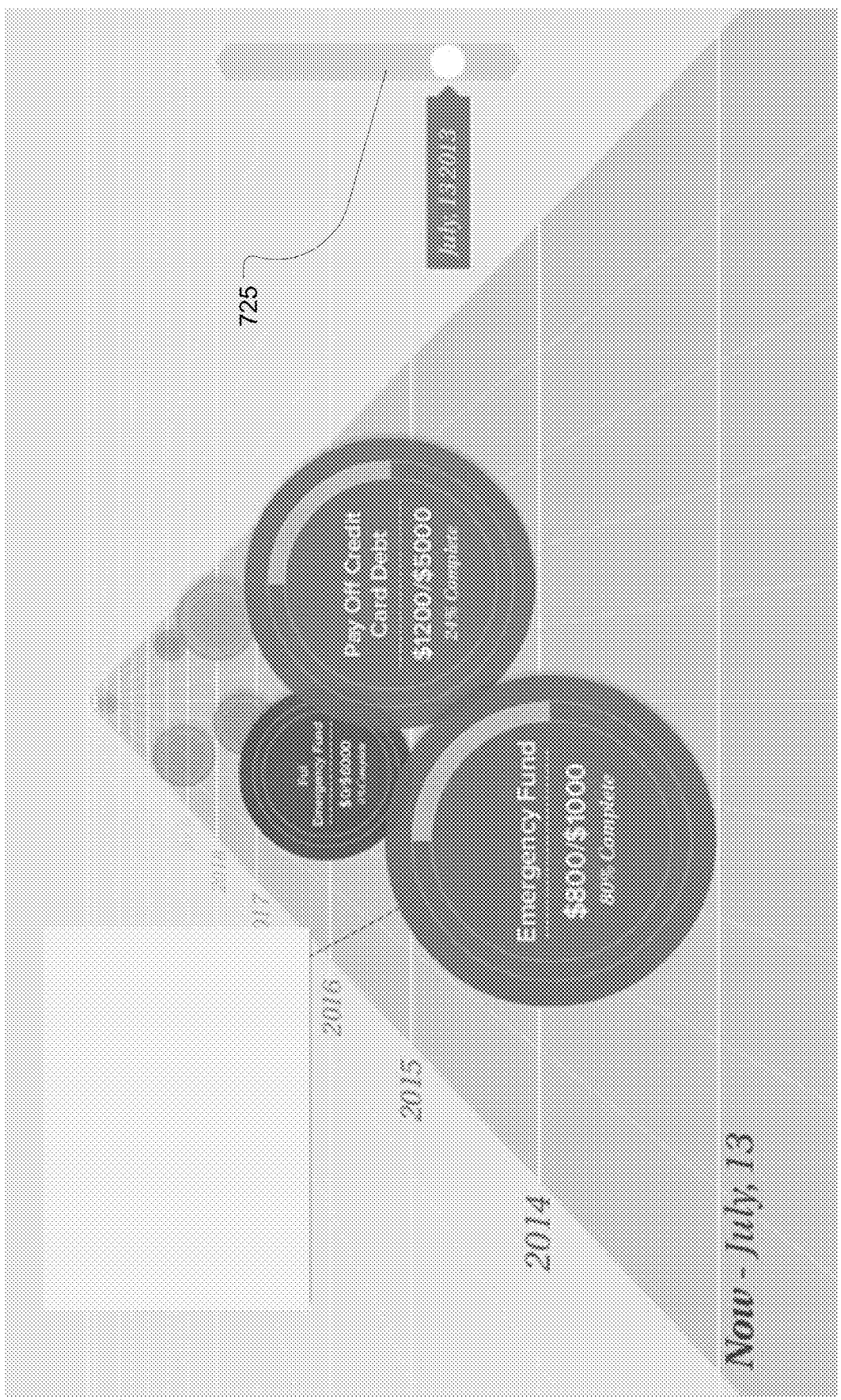

FIG. 8A illustrates the feature of a zoom control that allows a user to intuitively move through converging line graphic like they would move through the real world. In use, a user would select the slide type zoom control of the present embodiment and drag it to the value they desire. Accordingly, certain goal items would move into the foreground, and possibly out of the display area, while distant goal items would be provided with additional detail as their size grew according to the methods discussed previously with regard to FIG. 4A. FIG. 8B illustrates a method of zooming consistent with that illustrated in FIG. 8A.

Figure 9:
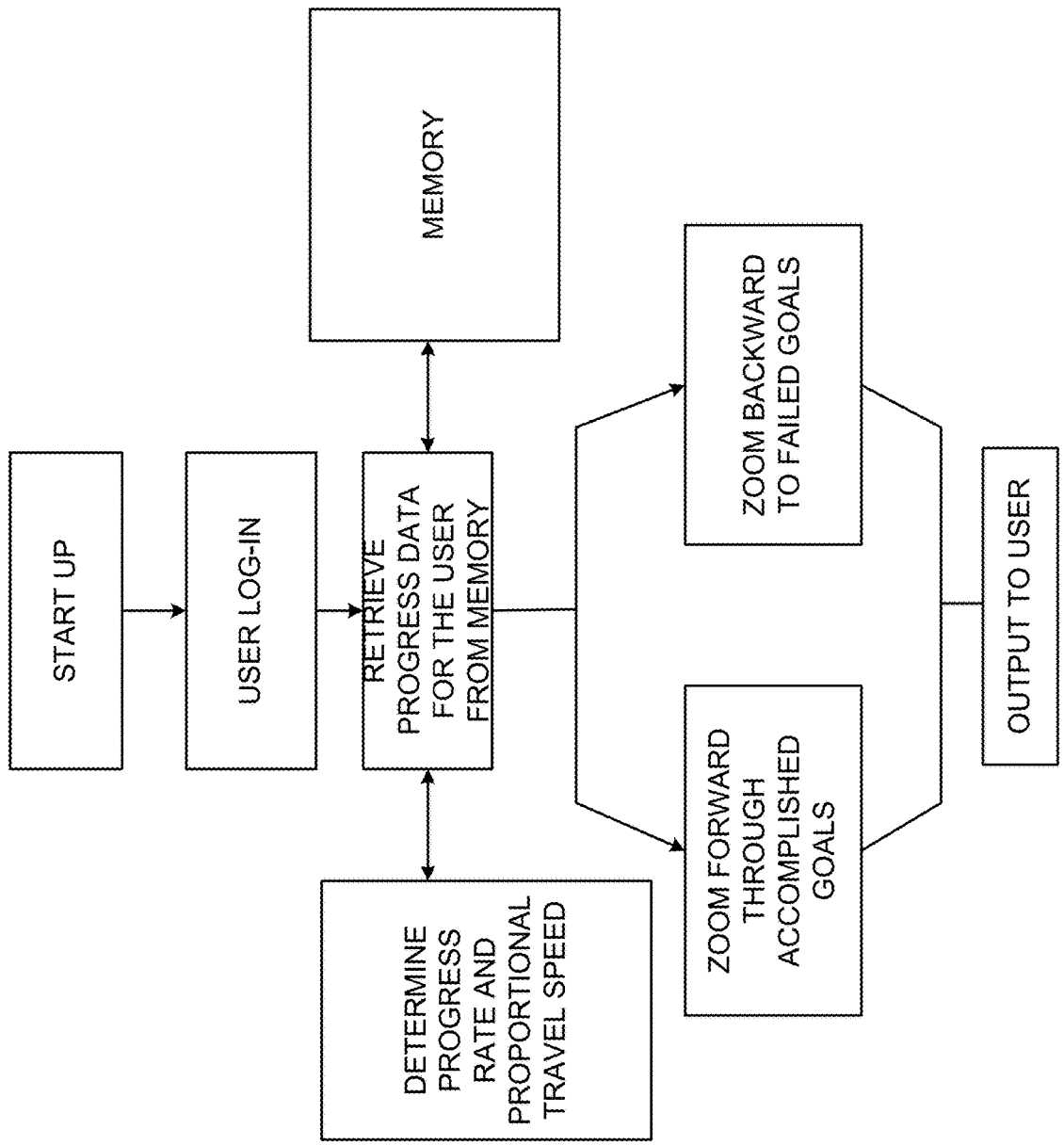
FIG. 9 illustrate embodiments in accordance with the principles and teachings of the disclosure.

FIG. 9 illustrates a method of rewarding or motivating users with a quick review of past goals that have been accomplished or failed respectively. In an embodiment the review may consist of traveling along the converging line graphic at a predetermined speed, thereby passing the financial goals of the past. In an embodiment, the various goals that may need additional attention can be flagged and notice provided to the user.

Figure 10:
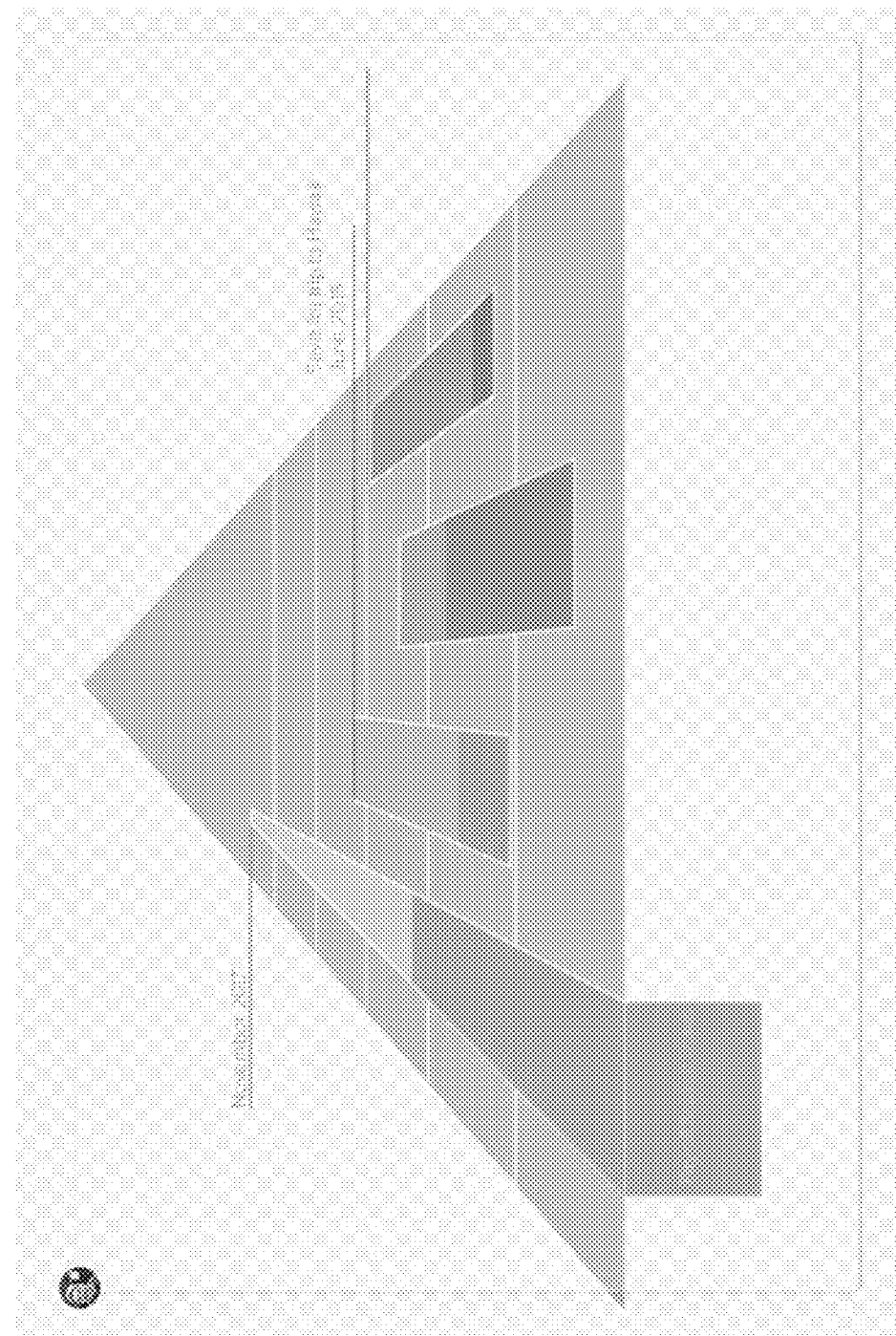
FIG. 10 illustrate embodiments in accordance with the principles and teachings of the disclosure.

FIG. 10 graphically illustrates goals that span a duration of time in a converging line graphic.

The foregoing description has been presented for the purposes of illustration and description. It is not intended to be exhaustive or to limit the disclosure to the precise form disclosed. Many modifications and variations are possible in light of the above teaching. Further, it should be noted that any or all of the aforementioned alternate implementations may be used in any combination desired to form additional hybrid implementations of the disclosure.

Further, although specific implementations of the disclosure have been described and illustrated, the disclosure is not to be limited to the specific forms or arrangements of parts so described and illustrated. The scope of the disclosure is to be defined by the claims appended hereto, any future claims submitted here and in different applications, and their equivalents.

What is claimed is:

1. A method comprising:
receiving, at a computing device, a plurality of different financial goals from a user, wherein each of the plurality of financial goals comprises a goal amount and a time for completing the financial goal;
receiving, at the computing device, a priority from the user for each of the financial goals, the priority determining an order for achieving the financial goals;
determining, at the computing device, a context for each of the plurality of financial goals based on the goal amount and the time for completing the financial goal, the context comprising a shape and an area value for graphical representations of each of the financial goals;
creating a list, stored in memory of the computing device, comprising the plurality of financial goals, the priorities for each of the financial goals, the context for each of the financial goals, and a temporal placement of each financial goal on a graphical converging distance graphic;
transforming, at the computing device, each of the financial goals in the list to a graphical representation of the financial goal based on the priority and shape and area value of the context of each financial goal;
normalizing, at the computing device, a size of each of the graphical representations for each of the plurality of financial goals based on the context shape and area value and an available size of a digital display of the computing device such that the size of each of the graphical representations falls within minimum and maximum size limits defined by a slope of an asymptotic graph;
determining, at the computing device, a relative position of the graphical representations of each of the plurality of financial goals on the converging distance graphic based at least in part on the time for completing the financial goals and the priority for the financial goals, wherein the converging distance graphic is oriented such that graphical representations of financial goals with future time periods are presented behind graphical representations of financial goals with more recent time periods;
preparing and displaying, on the digital display of the computing device, the converging distance graphic comprising the graphical representations of each of the plurality of financial goals positioned relative to one another along the converging distance graphic in temporal order such that the graphical representations are spatially ordered according to the relative timing of the plurality of financial goals, wherein graphical representations of goals that occur earlier in time are placed in a foreground and obscure at least a portion of graphical representations of goals that occur later in time, the converging distance graphic comprising signposts for marking the user's financial goals along the converging distance graphic;
preparing and displaying, on the digital display of the computing device, a graphical zoom control for dynamically setting a zoom level of the converging distance graphic;
receiving, at the computing device, input from a user interacting with the zoom control such that graphical representations of financial goals for recent time periods are removed from the converging distance graphic and graphical representations of financial goals for future time periods are moved into a foreground of the converging distance graphic and dynamically made larger as the zoom control is moved to a future time period in response to the user using the zoom control to set the zoom level to the future time period, wherein the sizes of the graphical representations of each of the plurality of goals are automatically adjusted according to the slope of the asymptotic graph;
pre-assembling and storing, at the computing device, additional attributes about each goal prior to a graphical representation of the goal being selected from the converging distance graphic;
receiving, at the computing device, a selection of the graphical representation of the goal from the converging distance graphic and presenting the pre-assembled additional attributes about the goal represented by the selected graphical representation;
interacting, at the computing device, with an online bill pay system;
receiving, at the computing device bill pay activity from the online bill pay system; and
dynamically modifying, at the computing device, the display of the graphical representations of the financial goals responsive to the received bill pay activity.

2. The method of claim 1, wherein each of the plurality of graphical representations have areas that are proportional to their corresponding amount value.

3. The method of claim 1, wherein the converging distance graphic comprises bounding lines such that when displayed two dimensionally the bounding lines converge in an upward direction.

4. The method of claim 1, wherein the relative position of the plurality of graphical representations is displayed between the bounding lines and ordered according to the time for completing the financial goal corresponding to each of the plurality of financial goals.

5. The method of claim 1, wherein the areas of the graphical representations are proportional to their position on the converging distance graphic.

6. The method of claim 1, wherein the areas of the graphical representations have a maximum area that is determined by a logarithmic factor.

7. The method of claim 1, wherein the areas of the graphical representations have a minimum area that is determined by a logarithmic factor.

8. The method of claim 1, further comprising determining, at the computing device, the areas of the graphical representations based on available display size.

9. The method of claim 1, further comprising displaying, on the digital display of the computing device, motion relative to the converging distance graphic such that a user perceives traveling along the converging distance graphic at a rate of travel.

10. The method of claim 1, wherein a rate of travel for the moving graphic is determined by meeting a predetermined threshold corresponding to each of the financial goals.

11. The method of claim 10, wherein, the rate of travel is positive in a perceived forward motion along the converging distance graphic.

12. The method of claim 10, wherein the rate of travel is negative in a perceived backward motion along the converging distance graphic.

13. A system comprising a computer, a network, computer storage and memory, and processors for performing the processes of:
receiving, at the computer, a plurality of different financial goals from a user, wherein each of the plurality of financial goals comprises a goal amount and a time for completing the financial goal;
receiving, at the computer, a priority from the user for each of the financial goals, the priority determining an order for achieving the financial goals;
determining, by the processor, a context for each of the plurality of financial goals based on the goal amount and the time for completing the financial goal, the context comprising a shape and an area value for graphical representations of each of the financial goals;
creating a list, stored in memory of the computer, comprising the plurality of financial goals, the priorities for each of the financial goals, the context for each of the financial goals, and a temporal placement of each financial goal on a graphical converging distance graphic;
transforming, by the processor, each of the financial goals in the list to a graphical representation of the financial goal based on the priority and shape and area value of the context of each financial goal;
normalizing, by the processor, a size of each of the graphical representations for each of the plurality of financial goals based on the context shape and area value and an available size of a digital display of the computer such that the size of each of the graphical representations falls within minimum and maximum size limits defined by a slope of an asymptotic graph;
determining, by the processor, a relative position of the graphical representations of each of the plurality of financial goals on the converging distance graphic based at least in part on the time for completing the financial goals and the priority for the financial goals, wherein the converging distance graphic is oriented such that graphical representations of financial goals with future time periods are presented behind graphical representations of financial goals with more recent time periods;
preparing and displaying, on the digital display of the computer, the converging distance graphic comprising the graphical representations of each of the plurality of financial goals positioned relative to one another along the converging distance graphic in temporal order such that the graphical representations are spatially ordered according to the relative timing of the plurality of financial goals, wherein graphical representations of goals that occur earlier in time are placed in a foreground and obscure at least a portion of graphical representations of goals that occur later in time, the converging distance graphic comprising signposts for marking the user's financial goals along the converging distance graphic;
preparing and displaying, on the digital display of the computer, a graphical zoom control for dynamically setting a zoom level of the converging distance graphic;
receiving, at the computer, input from a user interacting with the zoom control for such that graphical representations of financial goals for recent time periods are removed from the converging distance graphic and graphical representations of financial goals for future time periods are moved into a foreground of the converging distance graphic and dynamically made larger as the zoom control is moved to a future time period in response to the user using the zoom control to set the zoom level to the future time period, wherein the sizes of the graphical representations of each of the plurality of goals are automatically adjusted according to the slope of the asymptotic graph;
pre-assembling and storing, at the computing device, additional attributes about each goal prior to a graphical representation of the goal being selected from the converging distance graphic;
receiving, at the computing device, a selection of the graphical representation of the goal from the converging distance graphic and presenting the pre-assembled additional attributes about the goal represented by the selected graphical representation;
interacting, by the processor, with an online bill pay system;
receiving, at the computing device bill pay activity from the online bill pay system; and
dynamically modifying, by the processor, the display of the graphical representations of the financial goals responsive to the received bill pay activity.

14. The system of claim 13, wherein each of the plurality of graphical representations have areas that are proportional to their corresponding amount value.

15. The system of claim 13, wherein the converging distance graphic comprises bounding lines such that when displayed two dimensionally the bounding lines converge in an upward direction.

16. The system of claim 13, wherein the relative position of the plurality of graphical representations is displayed between the bounding lines and ordered according to the time for completing the financial goal corresponding to each of the plurality of financial goals.

17. The system of claim 13, wherein the areas of the graphical representations are proportional to their position on the converging distance graphic.

18. The system of claim 13, wherein the areas of the graphical representations have a maximum area that is determined by a logarithmic factor.

19. The system of claim 13, wherein the areas of the graphical representations have a minimum area that is determined by a logarithmic factor.

20. The system of claim 13, further comprising determining, by the processor, the areas of the graphical representations based on available display size.

21. The system of claim 13, further comprising displaying, on the digital display of the computer, motion relative to the distance-converging graphic such that a user perceives traveling along the distance-converging graphic at a rate of travel.

22. The system of claim 13, further comprising displaying, on the digital display of the computer, motion relative to the converging distance graphic such that a user perceives traveling along the converging distance graphic at a rate of travel.

23. The system of claim 22, wherein the rate of travel is positive in a perceived forward motion along the converging distance graphic.

24. The system of claim 22, wherein the rate of travel is negative in a perceived backward motion along the converging distance graphic.

* * * * *